United States Patent [19]

Clague et al.

[11] 4,342,343
[45] Aug. 3, 1982

[54] METHOD OF MAKING A NEGATIVE LEAD-ACID STORAGE BATTERY PLATE

[75] Inventors: Robert E. Clague, Berkley; Richard H. Hammar, Fraser; Douglas J. Harvey, Sterling Heights, all of Mich.

[73] Assignee: General Motors Corporation, Detroit, Mich.

[21] Appl. No.: 247,628

[22] Filed: Mar. 25, 1981

Related U.S. Application Data

[62] Division of Ser. No. 135,243, Mar. 31, 1980, abandoned.

[51] Int. Cl.³ .......................... B65B 3/04; H01M 6/00
[52] U.S. Cl. ..................................... 141/1.1; 29/623.5
[58] Field of Search ........................... 141/1.1, 32, 33; 429/94, 209, 233, 234–246; 29/623.5

[56] References Cited

U.S. PATENT DOCUMENTS

| | | |
|---|---|---|
| 480,575 | 8/1892 | Gandini . |
| 722,947 | 3/1903 | Cottrell . |
| 1,156,315 | 10/1915 | Rowley . |
| 2,234,731 | 3/1941 | Haunz . |
| 2,677,713 | 5/1954 | Weil et al. . |
| 3,466,193 | 9/1969 | Hughel . |
| 3,758,340 | 9/1973 | Adams ................................. 141/1.1 |
| 3,839,090 | 10/1974 | Morelock et al. . |
| 3,891,459 | 6/1975 | McCartney, Jr. et al. . |

FOREIGN PATENT DOCUMENTS 2831127 1/1979 Fed. Rep. of Germany .
1553504 9/1979 United Kingdom .

Primary Examiner—Houston S. Bell, Jr.
Attorney, Agent, or Firm—Lawrence B. Plant

[57] ABSTRACT

A method of making a negative lead-acid storage battery plate wherein a gossamer mat of elongated, carbon/graphite fibers is bonded to a thin paper sheet which is thereafter applied to the face of the plate such that the carbon/graphite fibers lie contiguous the active material of the plate and serve to distribute the "formation" current more uniformly across the face of the unformed plate and into the regions of the unformed active material most remote from the conductive grid wires.

4 Claims, 2 Drawing Figures

METHOD OF MAKING A NEGATIVE LEAD-ACID STORAGE BATTERY PLATE

BACKGROUND OF THE INVENTION

This is a division of copending United States patent application Ser. No. 135,243 filed Mar. 31, 1980 in the names of R. E. Clague, R. H. Hammar and D. J. Harvey, now abandoned, and assigned to the assignee of the present invention.

This invention relates to lead-acid storage batteries, and more particularly, to negative plates therefor. In the unformed state, such plates typically comprise a leady active material (i.e., principally PbO) and a lead or lead alloy (hereafter lead) grid embedded therein to support the active material and distribute current substantially uniformly therethrough. During the formation process (i.e., initially charging the battery), the PbO is reduced to lead to form the negative plate.

Motor vehicle manufacturers are constantly seeking ways to reduce vehicle weight and thereby conserve fuel. Likewise battery manufacturers are constantly seeking ways to increase the energy density (i.e., watt-hrs/lb) of their batteries. One way to reduce battery weight or increase energy density of a lead-acid battery is to reduce the amount of lead in the grid supporting the leady active material of the negative plate. One way of accomplishing this is to reduce the number of grid wires so as to increase the size (i.e., area) of the openings between the grid wires which serve to contain the plate's leady active material. Increasing the size of the openings in the grids, however, reduces the practical formability of the active material in the openings (often called the active material pellet). In this regard, as the size of the opening increases and the distance from the center of the active material pellet to the surrounding grid wires increases, there is a tendency for the center of the pellet to remain unformed. By way of reference, typical commercial expanded wrought Pb-Ca-Sn alloy grids for negative plates have had diamond shaped openings about 87 mm$^2$ in area and distances of 4.4 mm from the center of the pellet to the grid wires.

The use of calcium as a grid hardening element (i.e., in maintenance-free batteries) has further complicated formation. In this regard, the calcium has increased the electrochemical formation on-charge plate potentials as compared to the earlier use of Sb in the grids. These higher potentials appear to damage the bond between the grid and the active material, and accordingly, have necessitated the use of lower current densities during the formation schedule to avoid disruption of this bond. Reducing the formation current increases the formation time with all the manufacturing problems attendant thereto. Attempts to decrease formation times by means of higher currents has resulted in batteries of lower quality primarily as a result of overformation near the grid wire, breakdown of grid-to-active material adhesion and decrease of active material cohesion.

It is an object of the present invention to provide negative lead-acid storage battery plates having increased energy densities, lighter weight grids and substantially the same formability and performance of the lower energy density and heavier grided plates now in use. It is a further object of the present invention to provide negative lead-acid battery plates employing wrought Pb-Ca-Sn grids which are capable of faster formation with reduced energy consumption. These and other objects of the present invention will be more readily understood from the description of the invention which follows.

BRIEF DESCRIPTION OF THE INVENTION

The present invention contemplates a laminated negative lead-acid storage battery plate. The plate, in its unformed state, comprises a conductive lead or lead alloy grid (hereafter lead) embedded in a leady (i.e., principally lead oxide) active material and a paper-borne layer of carbon or graphite (hereafter carbon) fibers (i.e., greater than about 6 mm long) pressed against the grid-active material composite. The carbon fibers effectively extend the conductivity of the grid across the entire face of the plate to more uniformly distribute the formation current thereacross and primarily into the active material in the central regions of the openings defined by the grid wires. In a preferred embodiment, the carbon fibers are in the form of a thin gossamer mat of randomly oriented fibers ranging from about 25 mm to 75 mm in length and secured to the surface of a thin carrier sheet of tissue paper. The fiber may be glued (e.g., with rubber cement) or otherwise mechanically secured to the paper as, for example, by intermingling the carbon fibers with the cellulose fibers in a conventional paper making type process (e.g., fourdrinier). Preferably, the carbon fibers will have substantial direct physical contact with the grid wires. The presence of the mat permits wider spacing of the grid wires which increases the size of the openings between the grid wires and reduces the volume of lead used in the grid. The volume gained by removing grid lead can be made up with additional active material. Carbon fiber mats applied to the surface of negative plates have permitted the substantially complete electrochemical formation of negative plates having grids whose inter-wire openings were as large as 1960 mm$^2$. Single cell tests have shown that a twentyfold increase in negative plate pellet size (i.e., grid opening) resulting in grid weight reductions up to about 56% is possible with the present invention without significantly adversely affecting other electrical properties of the plate.

Conductive fibers have heretofore been proposed for use in Pb-acid battery plates, but no significant commercial use thereof has been observed. One reason may be that no easy or economical method for incorporating these fibers into plates has been proposed. For example, it was heretofore proposed to mix short bits of the fibers into the active material and paste the mix onto a grid. Homogeneously mixing the short fibers with the paste would appear to complicate the paste-mixing process as well as the grid-pasting operation. Moreover, it seems that the fiber bits would lose continuity with each other and become isolated in the paste, hence, reducing their ability to effectively act as a grid extender. Another proposed technique employs graphite fibers twisted together with grid wires in "pipe cleaner" fashion so as to provide a plurality of graphite whiskers extending radially outwardly from the twisted grid wire. The technique is extremely complex from a manufacturing standpoint.

The present invention contemplates a very simple and economical process for applying carbon fibers to a negative battery plate without impeding their effectiveness as grid extenders. More specifically, and in a preferred embodiment, the carbon fibers are secured to a substantially continuous length of carrier paper to form a carbon-paper laminate. The carbon-paper laminate is cut to a width appropriate to the dimensions of the plates to which it is being applied and coiled into rolls. The coiled laminate is then applied to the plate using substantially conventional belt pasting techniques, an example of which is discussed hereinafter in conjunction with the more detailed description of the invention.

The carrier paper may take a variety of forms including newsprint, and high wet strength tissue paper. The paper serves not only to carry the carbon into the pasting zone, but further keeps the plates from sticking to the pasting belt and to each other later during the stacking and drying process. The paper dissolves during formation leaving only the carbon fibers on the surface of the plate.

The carbon fibers are available in random-layered orientation mats wherein the fibers vary in length from about 25 mm to 73 mm. One such mat is sold by Union Carbide Corp. under the name "Thornel" (VMA grade) and is available in sheets 10 mm thick and 500 mm wide. Thornel (VMA grade) is made from petroleum pitch. Continuous length fiber mats are also useful and available from Union Carbide Corp. as Thornel VSA-11 or Hercules as Magnamite AS-3 (i.e., made from polyacrylonitrile). The graphite fibers have considerably lower electrical resistivities than the resistivity of the unformed paste, and hence, serve as better conductors into the central regions of the paste pellets. Loose fibers bonded to the paper are also useful. A variety of graphite loadings have been used ranging from about 3.9 to about 20 grams per square meter. Tests using these loadings indicate that even less dense loadings (perhaps as low as 1 to 2 grams per square meter) would also be acceptable. In this regard, substantially no difference in formability was observed between the high and low density loadings. The carbon fibers may be secured to the paper carrier in a variety of ways. In one embodiment, a flimsy, gossamer mat of the fibers is glued to the paper carrier sheet with a plurality of small rubber cement dots. In another embodiment, loose fibers are sprinkled onto the paper sheet and held in place with a suitable adhesive. In still another embodiment, the carbon fibers are codeposited with the cellulose fibers (e.g., in a four-drinier-like process) to form a composite carbon paper sheet having a carbon-rich surface bonded to a paper-rich surface by an intermediate zone in which the carbon fibers are mechanically entwined with the cellulose fibers. The precise method/means for forming the carbon-paper composite is not considered part of the present invention.

DETAILED DESCRIPTION OF SPECIFIC EMBODIMENTS OF THE INVENTION

Figure 1:
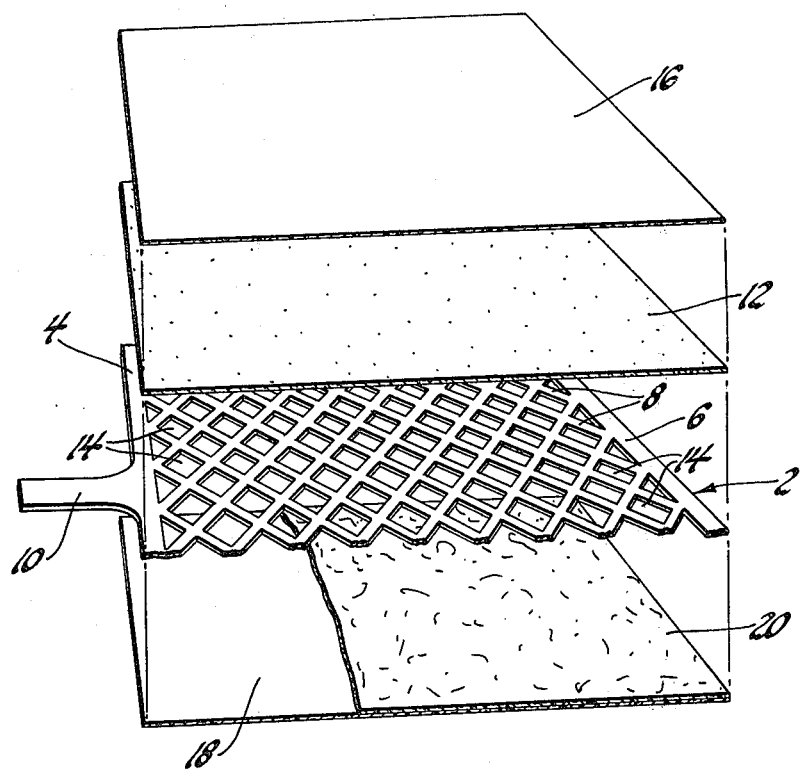
Figure 2:
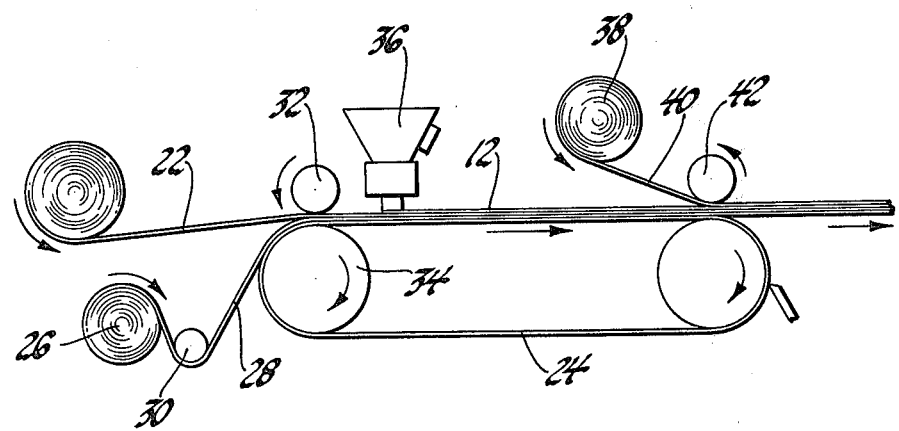

FIG. 1 is an exploded, schematic view of a negative lead-acid storage battery plate in accordance with the present invention; and FIG. 2 is a schematic illustration of a grid pasting process employing carbon-paper laminates in the manufacture of negative lead-acid storage batteries in accordance with the present invention.

FIG. 1 illustrates an expanded lead grid 2 including an upper border 4, a lower border 6, and a plurality of grid wires 8 criss-crossing each other throughout the plane of the grid 2. A lug 10 is provided on the top border 4 for joining the plate to other like polarity plates in a complete battery cell group (i.e., positive and negative plates). The grid 2 is actually embedded in the active material 12 which is here shown as a separate and distinct layer for illustration purposes only. In the pasting process, the pasty active material 12 is pressed into the openings 14 defined by the grid wires 8. The active-material-pasted grid 2 is sandwiched between two layers of paper sheet 16–18 at least one of which (here shown to be bottom sheet 18) has a layer of carbon fibers 20 bonded thereto for directly contacting the pasted grid.

FIG. 2 illustrates what is essentially a conventional paper-strip type belt pasting machine except that at least one of the conventionally used paper-strips is replaced with a carbon-paper laminate. A continuous strip 22 of expanded lead grid-making stock is fed onto a continuous canvas belt 24. Carbon-paper strip 28 is paid out from a reel 26 thereof under an idler 30 onto the belt 24 and beneath the grid strip 22. A nip roller 32 presses the grid and carbon-paper strips firmly against the belt 24 on the drum 34. The strips 22–28 pass beneath a paste hopper and feed system 36 which distributes a layer of paste 12 onto the grid strip 22 and forces it into the openings 14 thereof. A second reel 38 pays out a continuous strip 40 of tissue paper for the top side of the pasted grid which strip 40 is pressed onto the pasted grid by means of the system drive roll 42. The pasted strip is then cut into individual plates and appropriately dried, stored, cured, etc. as appropriate and well known in the art. While in the specific embodiment illustrated, only the lower strip 28 comprised the carbon-paper laminate, it is to be appreciated that the upper coil 38 might also comprise a similar material for sandwiching the pasted grid between two layers of paper-borne carbon fibers. It is also to be appreciated that the carbon-paper strip might also be applied solely to the top side of the plate after pasting. In this embodiment, the carbon fibers would not physically engage the grid as readily as when the laminate is applied from the bottom and before pasting. Rather, when applied after pasting, the laminate is separated from the grid by a thin layer of PbO paste 12. This PbO paste 12 has a higher electrical resistivity than the carbon, and accordingly, tends to initially insulate the carbon fibers from the grid. However, shortly after commencement of formation, this thin insulating lead oxide layer is reduced to lead and thereby establishes the necessary conductivity bridge between the grid and carbon fibers to cause the formation current to spread more uniformly throughout the plate during the remainder of the formation process.

Graphite fiber mats of various densities (i.e. $g/m^2$) were applied to pasted, expanded, wrought, Pb-Ca-Sn negative grids having a variety of large sized interwire openings therein and formation studies made. The grids tested included openings whose areas were 452 $mm^2$, 1054 $mm^2$ and 1960 $mm^2$. The lightest grid weighted 32 grams as compared to about 52 grams for a conventional expanded Pb-Ca-Sn grid. The graphite fibers used in the tests were made by manually separating thin layers of fiber from 10 mm thick "Thornel type p" fiber mat from Union Carbide Corp. The thin mats for the tests varied weightwise from about 0.2 to 0.64 grams. The test plates were assembled between two plates of positive polarity and electrochemically formed in 1.220 specific gravity sulfuric acid, for 1.75 hours at 3 amperes and constant temperature. After the formation test, each plate was washed in running water for 20–30 minutes, dried and analyzed for unformed PbO content. For all carbon-bearing electrodes, no difficulty was encountered in converting substantially the entire PbO paste pellet within the opening to lead. Identical grids formed the same way, but without carbon fibers, demonstrated only 50 percent conversion of the active material in the openings. A number of tests were conducted to ascertain the minimum amount of carbon fiber content required for complete formability. Plates with graphite fiber loadings as low as 3.9 gs/m$^2$ formed just as well as plates made with much higher loadings (i.e., 10 gs/m$^2$). Lower density carbon fiber materials were not available though the tests gave every indication that much lower carbon fiber loadings would be acceptable and, of course, more economical.

The embodiments of the invention in which an exclusive property or privilege is claimed are defined as follows:

1. A method of distributing a plurality of interconnected carbon fibers over the face of a pasted lead-acid storage battery plate to enhance the formability thereof comprising the steps of:

securing said fibers to the surface of a paper carrier; and pressing said surface against said face so as to intimately engage said fibers with said paste and attach said paper to said plate.

2. A method of distributing a plurality of interconnected carbon fibers over the face of a substantially continuous strip of lead-acid storage battery plate-making stock comprising the steps of:

securing said fibers to the surface of a substantially continuous paper carrier strip;

feeding said carrier strip along with a substantially continuous strip of reticulated conductive battery grid stock into a machine for pasting a leady active material onto said stock; and pressing said surface and said leady active material together in said machine to intimately engage said fibers with said active material and thereby enhance the formability of battery plates cut from said plate-making stock.

3. A method of distributing a plurality of interconnected carbon fibers over the face of a substantially continuous strip of lead-acid storage battery plate-making stock comprising the steps of:

securing said fibers to the surface of a substantially continuous paper carrier strip;

applying a leady active material paste to a substantially continuous strip of reticulated, conductive battery grid stock; and pressing said surface and paste together to intimately engage said fibers with said paste and thereby enhance the formability of battery plates made from said plate-making stock.

4. A method of distributing a plurality of interconnected carbon fibers over the face of a substantially continuous strip of lead-acid storage battery plate-making stock comprising the steps of:

bonding a gossomer mat of randomly oriented carbon fibers to the surface of a substantially continuous paper carrier strip;

feeding said carrier strip along with a substantially continuous strip of reticulated, conductive battery grid stock into a machine for pasting a leady active material onto said stock; and pressing said surface and said leady active material together in said machine to intimately engage said mat with said active material and said paper to said plate.

* * * * *